(No Model.)

S. F. WELCH.
SAND BOX AND AXLE COLLAR.

No. 471,365. Patented Mar. 22, 1892.

Witnesses
John L. Jackson
Charles E. Pickard

Inventor
Samuel Frank Welch
By Bond & Adams
Attys.

UNITED STATES PATENT OFFICE.

SAMUEL FRANK WELCH, OF AURORA, ILLINOIS, ASSIGNOR TO THE WESTERN WHEELED SCRAPER COMPANY, OF SAME PLACE.

SAND-BOX AND AXLE-COLLAR.

SPECIFICATION forming part of Letters Patent No. 471,365, dated March 22, 1892.

Application filed October 19, 1891. Serial No. 409,195. (No model.)

*To all whom it may concern:*

Be it known that I, SAMUEL FRANK WELCH, residing at Aurora, in the county of Kane and State of Illinois, and a citizen of the United States, have invented certain new and useful Improvements in a Combined Sand-Box and Axle-Collar, of which the following is a specification, reference being had to the accompanying drawings, in which—

Figure 1:
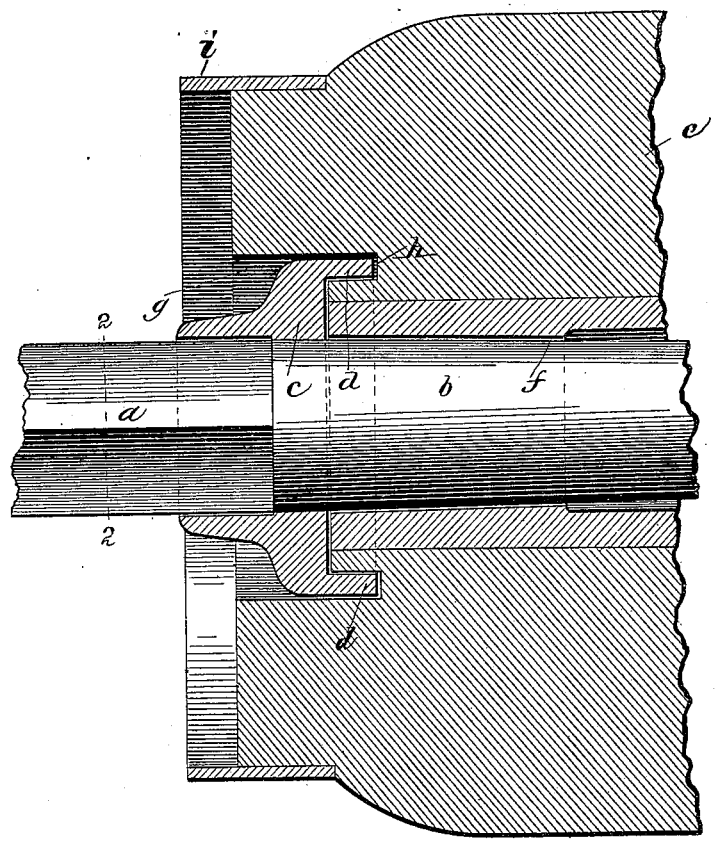
Figure 2:
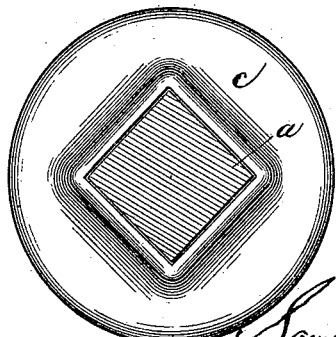

Figure 1 is a longitudinal vertical section through the hub of a wheel, showing my improved sand-box; and Fig. 2 is a cross-section of the axle on line 2 2 of Fig. 1.

My invention relates to axle-collars for vehicles or wheeled implements which are used in sandy regions or in work which necessitates their exposure to sand or dust. In implements which are used in handling dirt— such as road-scrapers and wagons—the spindles become rapidly worn out, and the efficiency of the implement is greatly decreased by the action of the dirt or sand which constantly finds its way to the spindle.

The object of my invention is to provide an improved axle-collar which will also be an efficient sand-box to prevent the admission of sand to the spindle. I accomplish this object as hereinafter specified and as illustrated in the drawings.

That which I regard as new will be pointed out in the claim.

In the drawings, $a$ indicates the outer end of an axle-tree on which is carried a spindle $b$. The axle-tree $a$ is preferably made of iron or steel, and the spindle $b$ is fitted upon it in the usual manner.

$c$ indicates a collar, which is securely fastened upon the outer end of the axle-tree $a$, and preferably extends over the inner end of the spindle $b$, as shown in Fig. 1. The collar $c$ is preferably shrunk upon the axle-tree $a$ to rigidly secure it in place; but it may be rigidly secured thereupon in any other suitable manner.

$d$ indicates an annular flange, which is formed upon the outer edge of the collar $c$ on the side next to the spindle $b$, as shown.

$e$ indicates the hub of a wheel, which is provided with the usual bearing $f$, adapted to fit upon the spindle $b$.

$g$ indicates a recess formed in the inner end of the hub $e$, which is adapted to receive the collar $c$. An annular groove $h$ is provided in the inner end wall of the recess $g$, which is adapted to receive the flange $d$ when the hub is placed upon the spindle. The hub $e$ may be secured upon the spindle in the usual manner.

By thus constructing the collar $c$ and adapting it to fit into the inner end of the hub $e$, as above described, the spindle is fully protected from sand or dust, as the flange $d$, fitting into the recess $h$, prevents its access to the spindle, while by constructing the bottom wall of the recess $g$ with an annular groove $h$, into which the flange $d$ projects, I am enabled to bodily arrange the flanged collar $c$ within the recess $g$ in such manner that the hub-band $i$, as well as the recessed end of the hub, protects such flanged collar. By forming the collar $c$ and the sand band or flange $d$ in a single piece and rigidly securing this collar to the spindle $b$ I avoid the necessity of employing a separate collar.

That which I claim as new, and desire to secure by Letters Patent, is—

The combination, with the axle-tree $a$ and the spindle $b$, of the wheel-hub $e$, provided at one end with the collar-receiving recess $g$, having its bottom wall formed with the annular flange-receiving groove $h$, and the collar $c$, rigidly secured upon the axle within the recess of the wheel-hub and formed integral with an annular flange $d$, which extends into the annular groove in the bottom wall of the recess, whereby the hub-band, as well as the recessed end of the hub, protects the flanged collar, substantially as described.

SAMUEL FRANK WELCH.

Witnesses:
T. H. BEREMAN,
GEO. B. SHARP.